(12) United States Patent
DiLorenzo et al.

(10) Patent No.: US 12,352,372 B2
(45) Date of Patent: Jul. 8, 2025

(54) PINCH VALVE

(71) Applicant: Terumo BCT, Inc., Lakewood, CO (US)

(72) Inventors: Thomas G. DiLorenzo, Arvada, CO (US); Davis Benz, Wheat Ridge, CO (US)

(73) Assignee: Terumo BCT, Inc., Lakewood, CO (US)

( * ) Notice: Subject to any disclaimer, the term of this patent is extended or adjusted under 35 U.S.C. 154(b) by 13 days.

(21) Appl. No.: 18/161,357

(22) Filed: Jan. 30, 2023

(65) Prior Publication Data
US 2023/0250883 A1    Aug. 10, 2023

Related U.S. Application Data

(60) Provisional application No. 63/306,596, filed on Feb. 4, 2022.

(51) Int. Cl.
*F16K 7/04* (2006.01)
(52) U.S. Cl.
CPC ..................... *F16K 7/04* (2013.01)
(58) Field of Classification Search
CPC ........................ F16K 7/04; F16K 7/045–075
USPC ........................................................ 251/7, 8
See application file for complete search history.

(56) References Cited

U.S. PATENT DOCUMENTS

| | | | |
|---|---|---|---|
| 3,260,098 A * | 7/1966 | Gill | B21D 41/045 72/470 |
| 3,426,539 A * | 2/1969 | Whear | A01G 25/167 405/37 |
| 3,511,469 A * | 5/1970 | Ronald | F16K 7/045 251/285 |
| 4,176,671 A * | 12/1979 | Citrin | F16K 7/02 137/624.2 |
| 4,231,246 A * | 11/1980 | Gorenc | B21D 41/04 29/727 |

(Continued)

FOREIGN PATENT DOCUMENTS

JP    2019-211081 A    12/2019

OTHER PUBLICATIONS

International Search Report and the Written Opinion of the International Searching Authority issued in the corresponding PCT Application No. PCT/US2023/012068; mailed on May 16, 2023 (total 10 pages).

*Primary Examiner* — Craig M Schneider
*Assistant Examiner* — Andrew J Rost
(74) *Attorney, Agent, or Firm* — Harness, Dickey & Pierce, P.L.C.

(57) ABSTRACT

A pinch valve includes a base having a body and a head and an anvil aligned therewith and including a shaft and a pinch tip. The head is disposed at a first end of the body. The head includes a contact protrusion that has a radiused surface defining an apex disposed at a point furthest from a second end of the body and centered around a base axis. The pinch tip is disposed at a first end of the shaft and includes two planar surfaces disposed at acute angles relative to an anvil axis to form an acute point disposed at a point furthest from a second end of the shaft and centered around the anvil axis. The base and anvil are aligned to form a gap between the radiused surface and the acute point and are movable between a first and second positions to change dimensions of the gap.

18 Claims, 9 Drawing Sheets

(56) References Cited

U.S. PATENT DOCUMENTS

| | | | | |
|---|---|---|---|---|
| 4,257,446 | A * | 3/1981 | Ray | F16K 7/061 |
| | | | | 251/8 |
| 4,259,985 | A * | 4/1981 | Bergmann | F16K 7/045 |
| | | | | 137/870 |
| 4,303,222 | A * | 12/1981 | Campbell | F16K 31/52491 |
| | | | | 251/7 |
| 4,518,145 | A * | 5/1985 | Keltz | F16K 7/06 |
| | | | | 251/8 |
| 4,582,292 | A * | 4/1986 | Glotzback | A62C 33/04 |
| | | | | 251/9 |
| 5,181,413 | A * | 1/1993 | LaBounty | E21B 29/08 |
| | | | | 72/453.02 |
| 6,494,225 | B1 * | 12/2002 | Olewicz | F16K 7/045 |
| | | | | 251/9 |
| 2008/0087853 | A1 | 4/2008 | Kees | |
| 2012/0061599 | A1 * | 3/2012 | Keizer | F16K 31/0672 |
| | | | | 29/401.1 |
| 2013/0009079 | A1 * | 1/2013 | Ams | F16K 7/045 |
| | | | | 251/7 |
| 2014/0117261 | A1 | 5/2014 | Ohki | |
| 2019/0321588 | A1 | 10/2019 | Burnett et al. | |
| 2021/0215260 | A1 * | 7/2021 | Sato | F16K 37/0008 |
| 2021/0231231 | A1 | 7/2021 | Bar et al. | |

\* cited by examiner

PINCH VALVE

CROSS-REFERENCE TO RELATED APPLICATIONS

This application claims the benefit of U.S. Provisional Application No. 63/306,596 filed on Feb. 4, 2022. The entire disclosure of the above application is incorporated herein by reference.

FIELD

The present disclosure relates to flow control devices, and more particularly, to pinch valves for tubing.

BACKGROUND

This section provides background information related to the present disclosure which is not necessarily prior art.

Internal and/or external valves are often used to selectively control the flow of a material, including liquid and/or gas materials), through tubing (also referred to as conduits). In each instance, the valves can be operated to complete and/or partially block the flow of the material. Internal valves are those arranged at least partially within the cavity (also referred to as a lumen) of the respective tube and configured to create a physical obstruction directing flow. In contrast, external valves (also referred to as pinch valves) are arranged outside of the tube and configured to apply a force to an external surface of the respective tube thereby deforming the cavity to obstruct flow. External valves can thus provide means to control fluid flow (for example in a disposable tubing set) without requiring the installation of the often more expensive and complex internal valves. However, the reliability and repeatability of external valves are often dependent upon the shape, elasticity, and construction of the selected tubing. For example, while a section of tubing may be opened and closed several times using an external valve, as the frequency and duration of the movements increase, the available fluid control often becomes less reliable as the tube loses shape and/or elasticity. Further, in the instance of soft cassettes, excess material often lingers from the manufacturing process for the soft cassettes. The excess material may limit the deformation of the tubing by the external valve. Accordingly, it would be desirable to develop external valves having configurations that improve long-term performance.

SUMMARY

This section provides a general summary of the disclosure and is not a comprehensive disclosure of its full scope or all of its features.

In various aspects, the present disclosure provides a pinch valve that includes a base and an anvil. The base may include a body and a head. The body may have a base axis and may include a first end and a second end. The head may be disposed at the first end of the body. The head may include a contact protrusion that has a radiused surface. The radiused surface may define an apex disposed at a point furthest from the second end of the body and centered around the base axis. The anvil may be aligned with the base and may include a shaft and a pinch tip. The shaft may include an anvil axis and may include a first end and a second end. The anvil axis may be colinear with the base axis. The pinch tip may be disposed at the first end of the shaft. The pinch tip may have two planar surfaces disposed at acute angles relative to the anvil axis to form an acute point disposed at a point furthest from the second end of the shaft and centered around the anvil axis. The base and anvil may be aligned to form a gap between the radiused surface and the acute point. The base and anvil may be movable between a first position and a second position. The gap may be a first distance at the first position and a second distance at the second position. The second distance may be less than the first distance.

In one aspect, the head may further include a peripheral portion. The peripheral portion may have an average diameter that is greater than an average diameter of the body. The radiused surface of the contact protrusion may be disposed offset from and inside the peripheral portion.

In one aspect, the two planar surfaces may be separated by a first distance at the first end of the shaft and may be joined together to define the acute point at an end away from the shaft.

In one aspect, the acute point may include a radiused edge defined by a width of the two planar surfaces extending from a first side of the pinch tip to a second side of the pinch tip. An axis of the radiused edge may be perpendicular to the anvil axis.

In one aspect, the radiused surface of the base may have a first surface area that is at least five times larger than a second surface area of the radiused edge of the acute point.

In one aspect, the acute angles may be greater than or equal to about 5 degrees to less than or equal to about 45 degrees relative to the anvil axis.

In one aspect, the pinch valve may further include an actuator in communication with one of the base and the anvil. The actuator may be configured to move between a first position and a second position.

In one aspect, the actuator may be a linear actuator configured to receive the shaft.

In one aspect, the actuator may be a linear actuator configured to receive the body.

In various aspects, the present disclosure provides a pinch valve assembly. The pinch valve assembly may include a base, an anvil, and a linear actuator in communication with at least one of the base and the anvil. The base may include a radiused surface having a first surface area and defining a base apex centered around a base center axis. The anvil may align with the base and may include a radiused edge having a second surface area and defining an anvil apex centered around an anvil center axis. The first surface area of the base may be at least five times larger than the second surface area of the anvil. The linear actuator may be configured to move between a first position and a second position. The radiused surface of the base may oppose the radiused edge of the anvil and a gap may be defined therebetween. In the first position of the linear actuator, a first gap distance may be defined between the radiused surface and the radiused edge. In the second position of the actuator, a second gap distance smaller than the first gap distance may be defined between the radiused surface and the radiused edge.

In one aspect, the pinch valve assembly may further include a flexible tubing having a hollow cavity disposed in the gap between the radiused surface of the base and the radiused edge of the anvil, where when the actuator is in the first position, the hollow cavity may have a first diameter, and when the actuator is in the second position, the hollow cavity may have a second diameter that is less than the first diameter.

In one aspect, the flexible tubing may include a soft cassette.

In one aspect, the base may further include a body and a head. The body of the base may include a first end and a second end. The head of the base may be disposed at the first end of the body. The head may include a contact protrusion that defines the radiused surface disposed at a point furthest from the second end of the body.

In one aspect, the head may further include a peripheral portion having an average diameter that is greater than an average diameter of the body. The radiused surface may be disposed offset from and inside the peripheral portion.

In one aspect, the anvil may further include a shaft and a pinch tip. The shaft of the anvil may include a first end and a second end. The pinch tip may be disposed at a first end of the shaft. The pinch tip may include two planar surfaces disposed at acute angles relative to the anvil axis to form the radiused edge disposed at a point further from the second end of the shaft.

In one aspect, the two planar surfaces may be separated by a first distance at the first end of the shaft and may be joined together to form an acute angle at an end away from the shaft thereby defining the radiused edge. The radiused edge may extend from a first side of the pinch tip to a second side of the pinch tip. An axis of the radiused edge may be perpendicular to the anvil axis.

In one aspect, the acute angles may be greater than or equal to about 5 degrees to less than or equal to about 45 degrees relative to the anvil axis.

In various aspects, the present disclosure provides a pinch valve. The pinch valve may include a base and an anvil. The base may include a radiused surface having a first surface area and defining a base apex centered around a base center axis. The anvil may be aligned with the base and may include a radiused edge having a second surface area and defining an anvil apex centered around an anvil center axis. The first surface area of the radiused surface of the base may be at least five times larger than the second surface area of the radiused edge of the anvil. The radiused surface of the base may oppose the radiused edge of the anvil to form a gap and the pinch valve may be movable between a first position where the gap has a first gap distance and a second position where the gap has a second gap distance that is less than the first gap position.

In one aspect, the radiused surface may be a convex surface. The anvil may include a pinch tip. The pinch tip may include two planar surfaces disposed at acute angles relative to the anvil axis to form the radiused edge. The two planar surfaces may be separated by a first distance at a first end of the pinch tip and may be joined together to form the radiused edge at a second end of the pinch tip. The acute angles may be greater than or equal to about 5 degrees to less than or equal to about 45 degrees relative to the anvil axis.

In one aspect, the base may further include a body, a head, and a peripheral portion. The body may include a first end and a second end. The head may be disposed at a first end of the body. The heat may include a contact protrusion that defines the radiused surface disposed at a point furthest from the second end of the body. The peripheral portion may have an average diameter that is greater than an average diameter of the body. The radiused surface may be disposed offset from and inside the peripheral portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 1A:
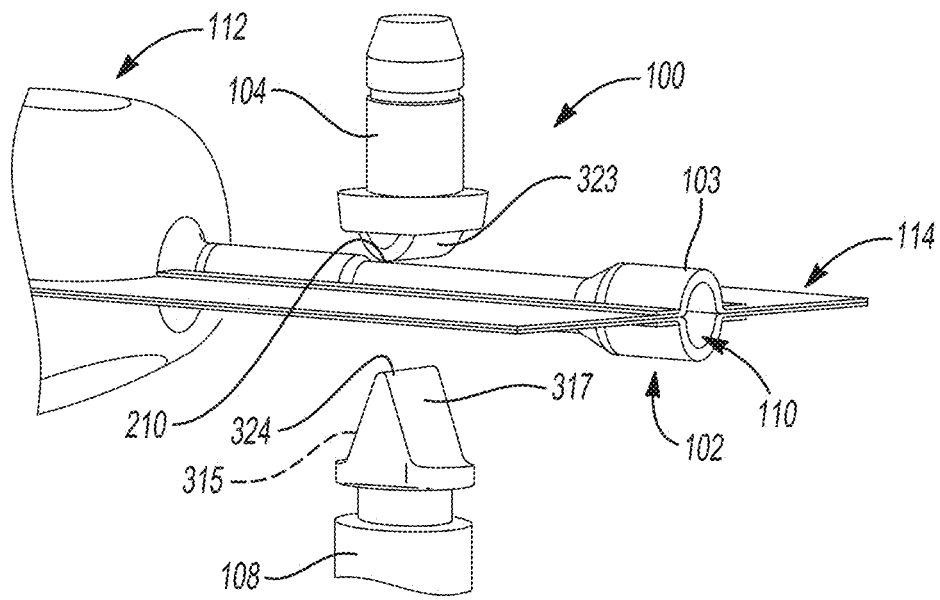
FIG. 1A is a perspective view of an example pinch valve in an open state in accordance with various aspects of the present disclosure.
Figure 1B:
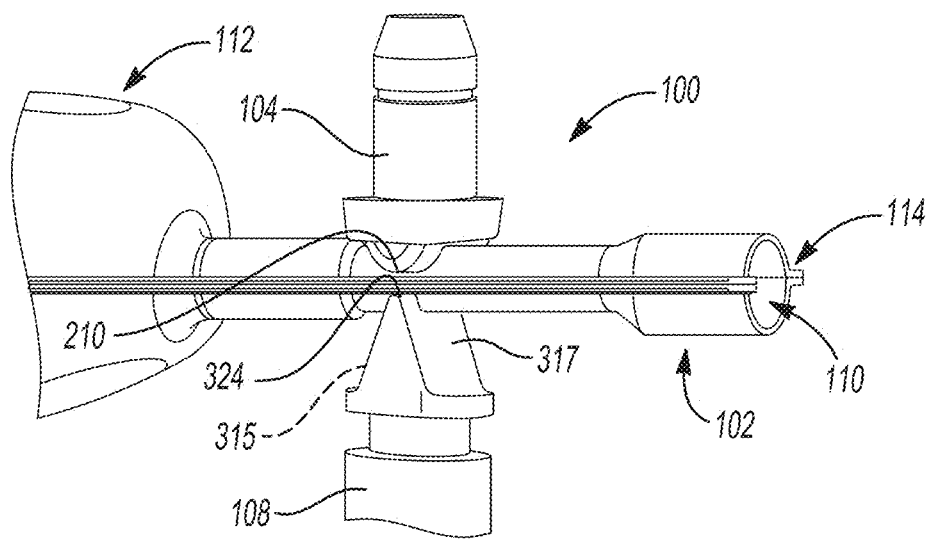
FIG. 1B is a perspective view of the example pinch valve introduced in FIG. 1A in a closed state in accordance with various aspects of the present disclosure.
Figure 3A:
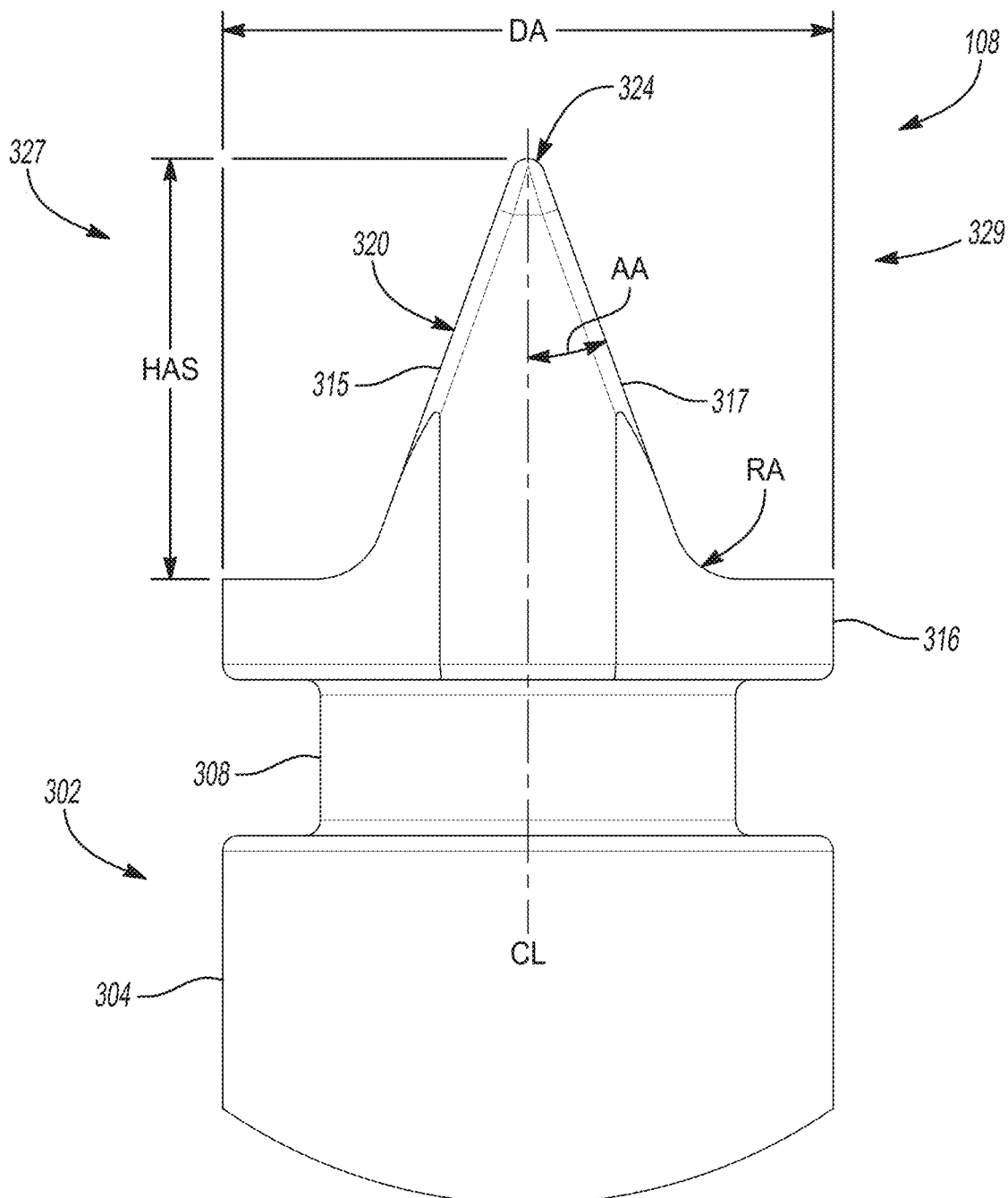
FIG. 3A is an elevation view of an anvil of the of the pinch valve illustrated in FIGS. 1A-1C in accordance with various aspects of the present disclosure.
Figure 3B:
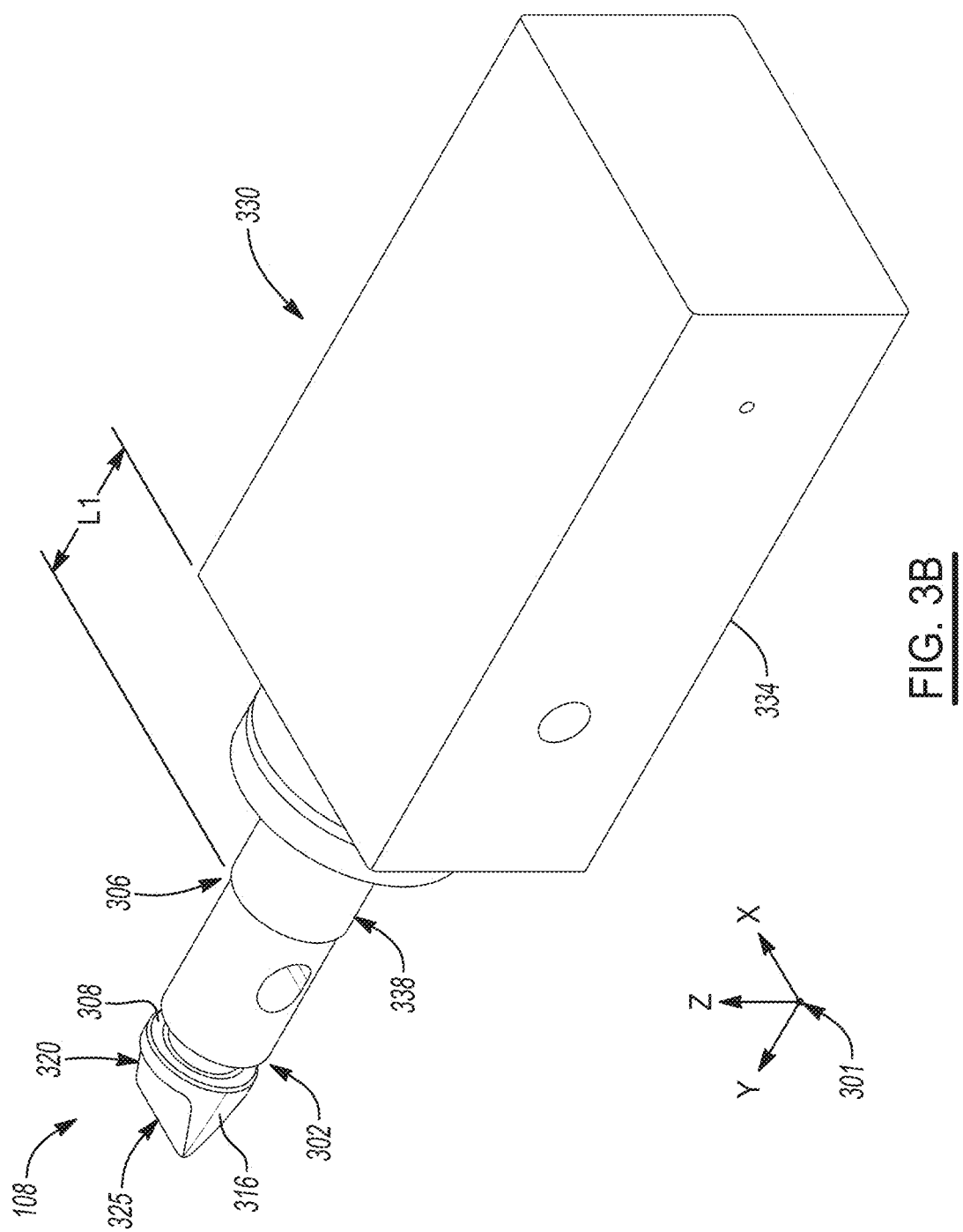
FIG. 3B is a rear perspective view of the anvil illustrated in FIG. 3A attached to a linear actuator in accordance with various aspects of the present disclosure.
Figure 3C:
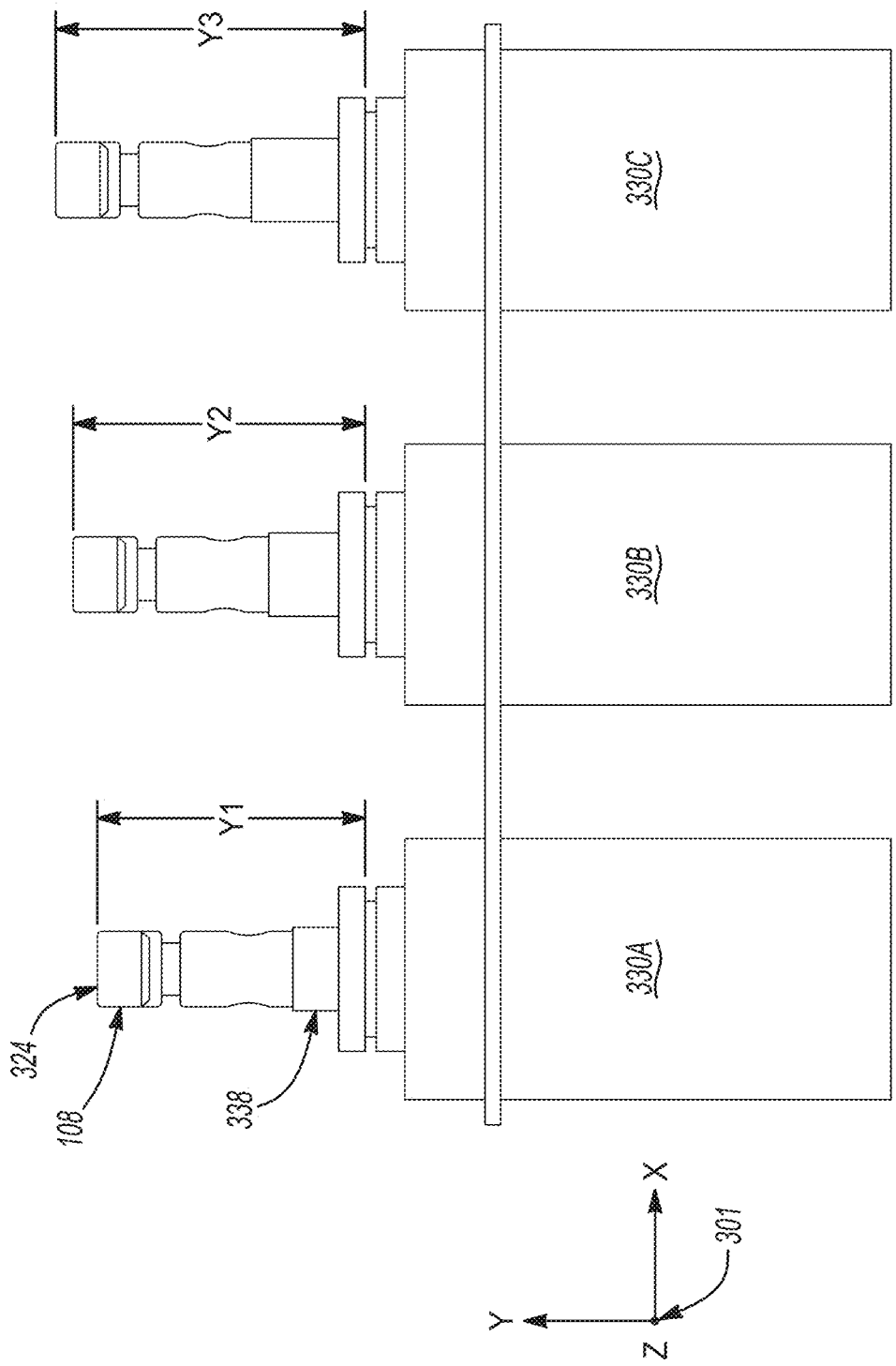
Figure 4A:
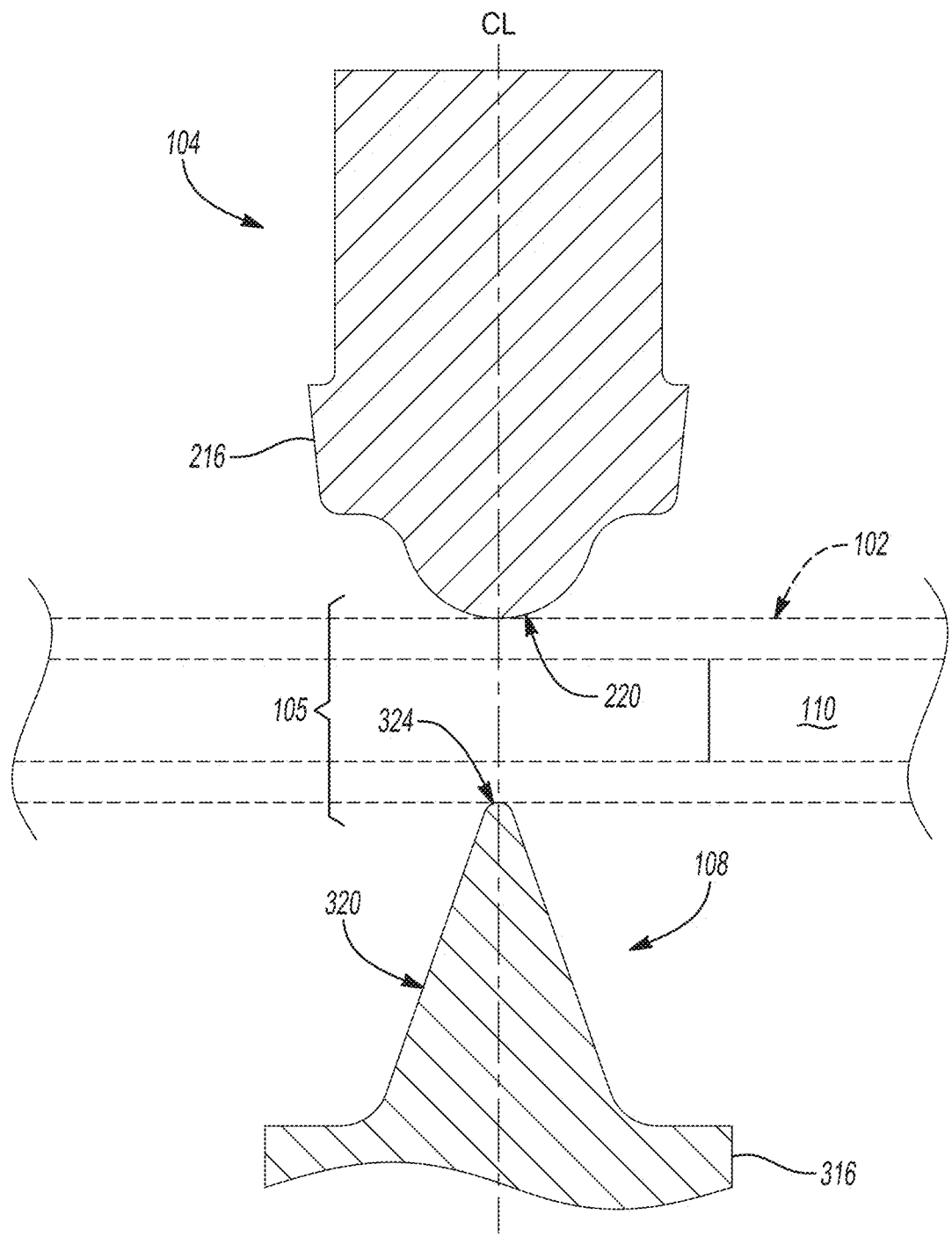
Figure 4B:
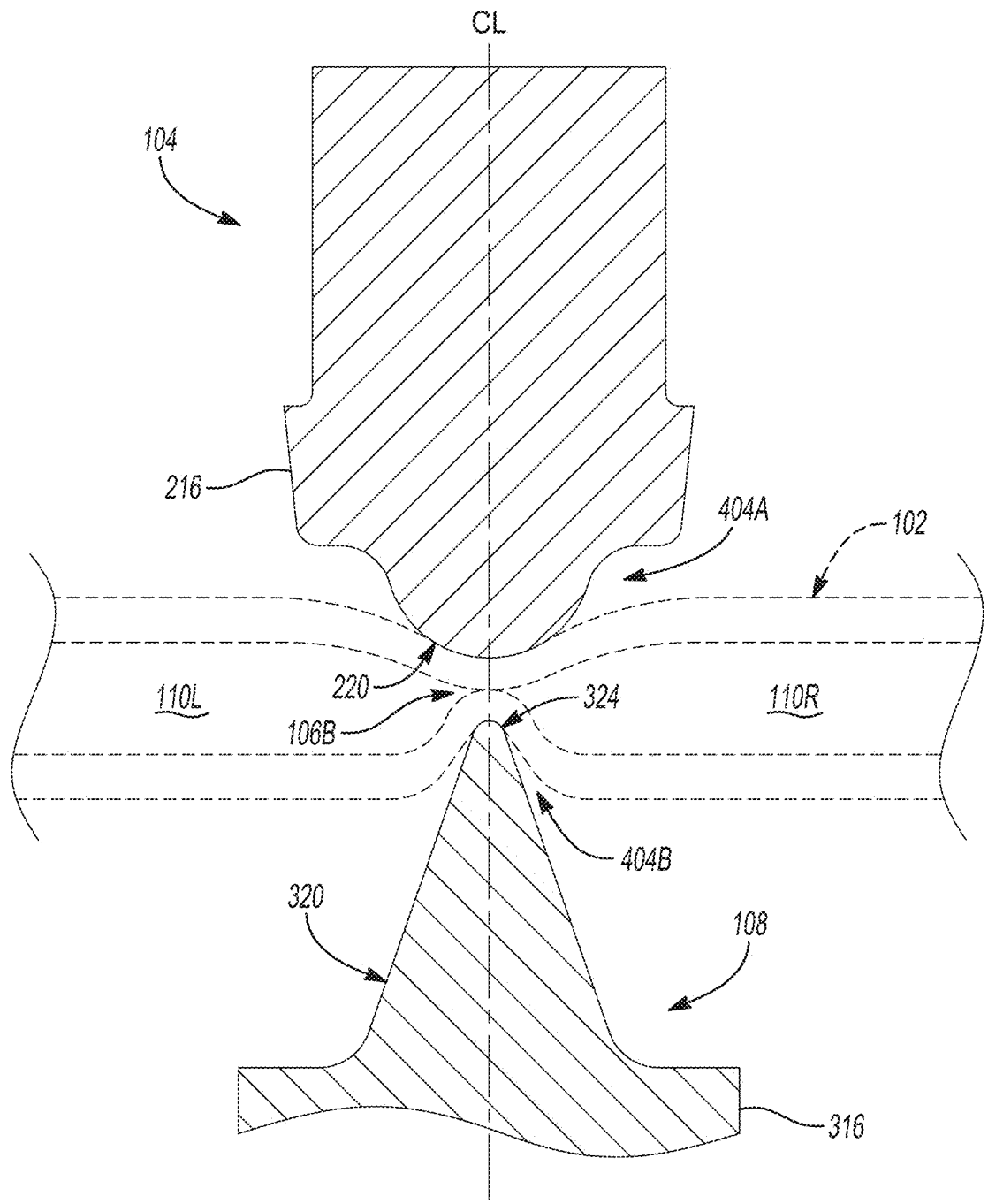

FIG. 3C includes elevation views of the anvil and linear actuator illustrated in FIG. 3B in various states of retraction and extension in accordance with various aspects of the present disclosure;

FIG. 4A is a cross-sectional illustration of the open pinch valve of FIG. 1A in accordance with various aspects of the present disclosure; and FIG. 4B is a cross-sectional illustration of the closed pinch valve of FIG. 1B in accordance with various aspects of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Various components are referred to herein as "operably associated." As used herein, "operably associated" refers to components that are linked together in operable fashion and encompasses embodiments in which components are linked directly, as well as embodiments in which additional components are placed between the linked components. "Operably associated" components can be "fluidly associated." "Fluidly associated" refers to components that are linked together such that fluid can be transported between them. "Fluidly associated" encompasses embodiments in which additional components are disposed between the two fluidly associated components, as well as components that are directly connected. Fluidly associated components can include components that do not contact fluid, but contact other components to manipulate the system (e.g., a peristaltic pump that pumps fluids through flexible tubing by compressing the exterior of the tube).

Example embodiments will now be described more fully with reference to the accompanying drawings.

Figure 1C:
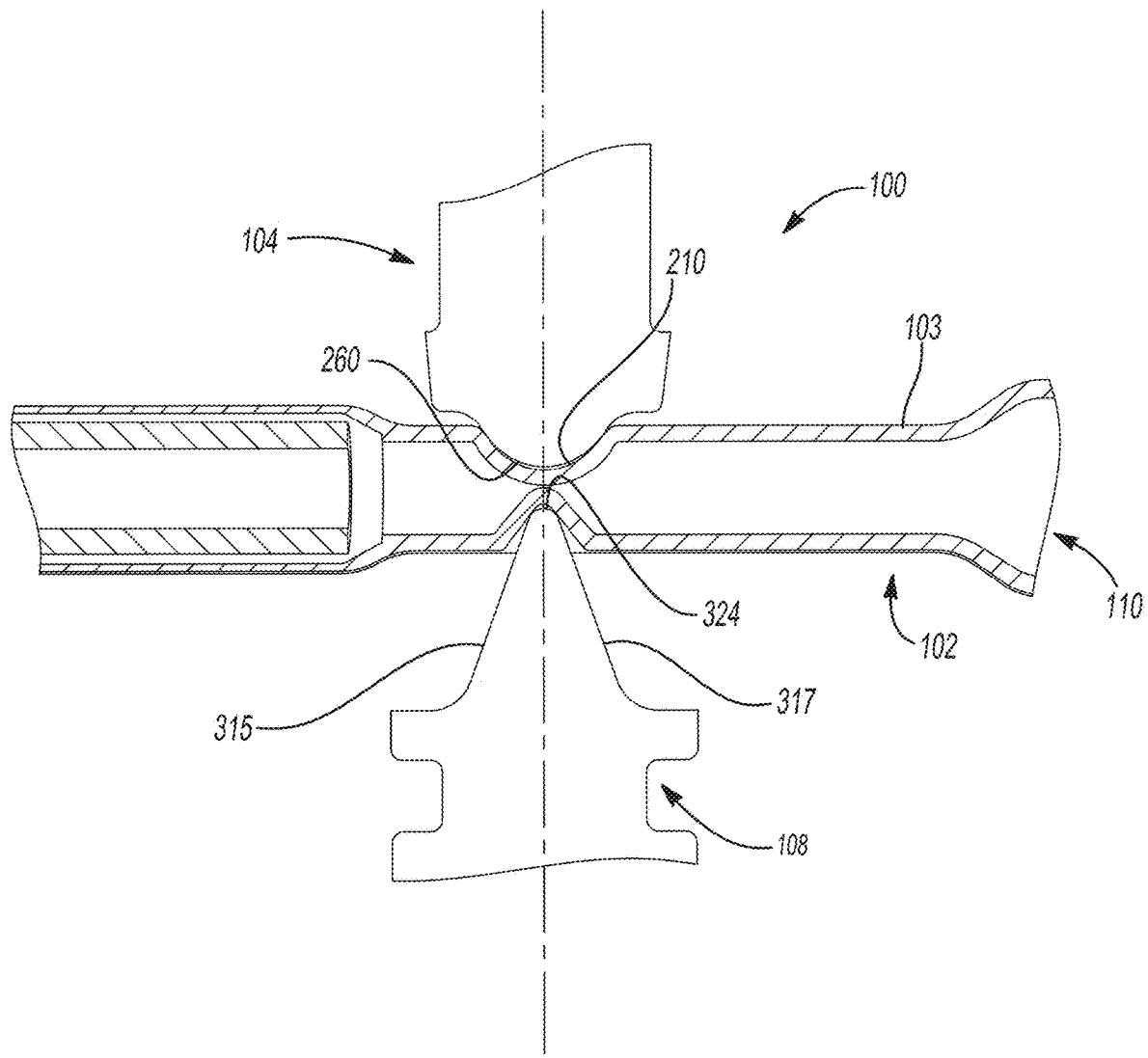
FIG. 1C is a cross-sectional illustration of the closed pinch valve of FIG. 1B in accordance with various aspects of the present disclosure.

FIGS. 1A-1C illustrates an example external pinch valve 100 configured to apply selected pressure to an exterior surface 103 of a flexible tube 102. In certain instances, the flexible tube 102 may be included in a soft cassette. As illustrated, excess material 114 remaining from the manufacture of the soft cassette 112 may extend from one or more sides of the flexible tube 102. The excess material 114 may restrict the movement of the flexible tube 102. In various aspects, the pinch valve 100 includes a first part (also referred to a as base) 104 and a second part (also referred to as an anvil) 108 that are configured to move relative to one another to apply the selected pressure to the exterior surface 103 of a flexible tube 102 disposed between therebetween. For example, the base 104 and the anvil 108 may be movable between a first or open position or state (as illustrated in FIG. 1A) where a cavity 110 of the flexible tube 102 is fully intact (i.e., not compressed or clamped) and a second or closed position or state (as illustrated in FIGS. 1B and 1C) where the cavity 110 is closed (i.e., fully compressed ro clamped) and flow through the flexible tube 102 is obstructed. The base 104 and the anvil 108 may be adjusted between the open and closed positions to achieve the selected pressure and flow through the cavity. For example, in certain variations, the base 104 may be actuated to move the pinch valve 100 from the open position towards the closed position and from the closed position towards the open position. In other variations, the anvil 108 may be actuated to move the pinch valve 100 from the open position towards the closed position and from the closed position towards the open position. In still other variations, the base 104 and the anvil 108 may both be actuated to move the pinch valve 100 from the open position towards the closed position and from the closed position towards the open position. In each variation, as illustrated for example, in FIGS. 1B and 1C, a radiused surface 323 of the base 104 may be moved towards an acute or sharp or contact point (also referred to as an end and/or edge) 324 of the anvil 108 and may be contacted with the flexible tube 102. For example, the radiused surface 323 of the base 104 and the acute point 324 may together apply a pinching force to the flexible tube 102 sufficient to alter and close the cavity 110. The pinching force applied by the radiused surface 323 of the base 104 and the acute edge 324 of the anvil 108 is sufficient to deform the cavity 110 despite the presence (or absence) of the excess material 114.

In certain variations, a major axis of the acute point 324 of the anvil 108 may be disposed parallel with a major axis of the radiused surface 323 of the base 104 so as to provide for contact of parallel surfaces of the flexible tube 102 altering the cavity 110, as best shown in FIG. 1C. Also, as illustrated, as a result of the shape of the radiused surface 323 the base 104 and the acute point 324 of the anvil 108 a portion of the material of the flexible tube 102 (and also a portion of the excess material 114 as needed) is able to move out of the pinched area and generally conform to a shape of the 104 and the shape of the anvil 108 and also to apply an increased closing force on the flexible tube 102. For example, since the area being pinched is isolated to a line contact and the remaining material of the flexible tube 102 (outside of this area) is allowed to elastically form around the pinching surfaces of the pinch valve 100 (i.e., the radiused surface 323 the base 104 and the acute point 324 of the anvil 108), the flexible tube 102 is prevented from applying a restrictive force (against the pinching force)

outside of the area being pinched, allows for repeatable and reliable (e.g., nonleaking) closures at the point of contact.

Figure 2A:
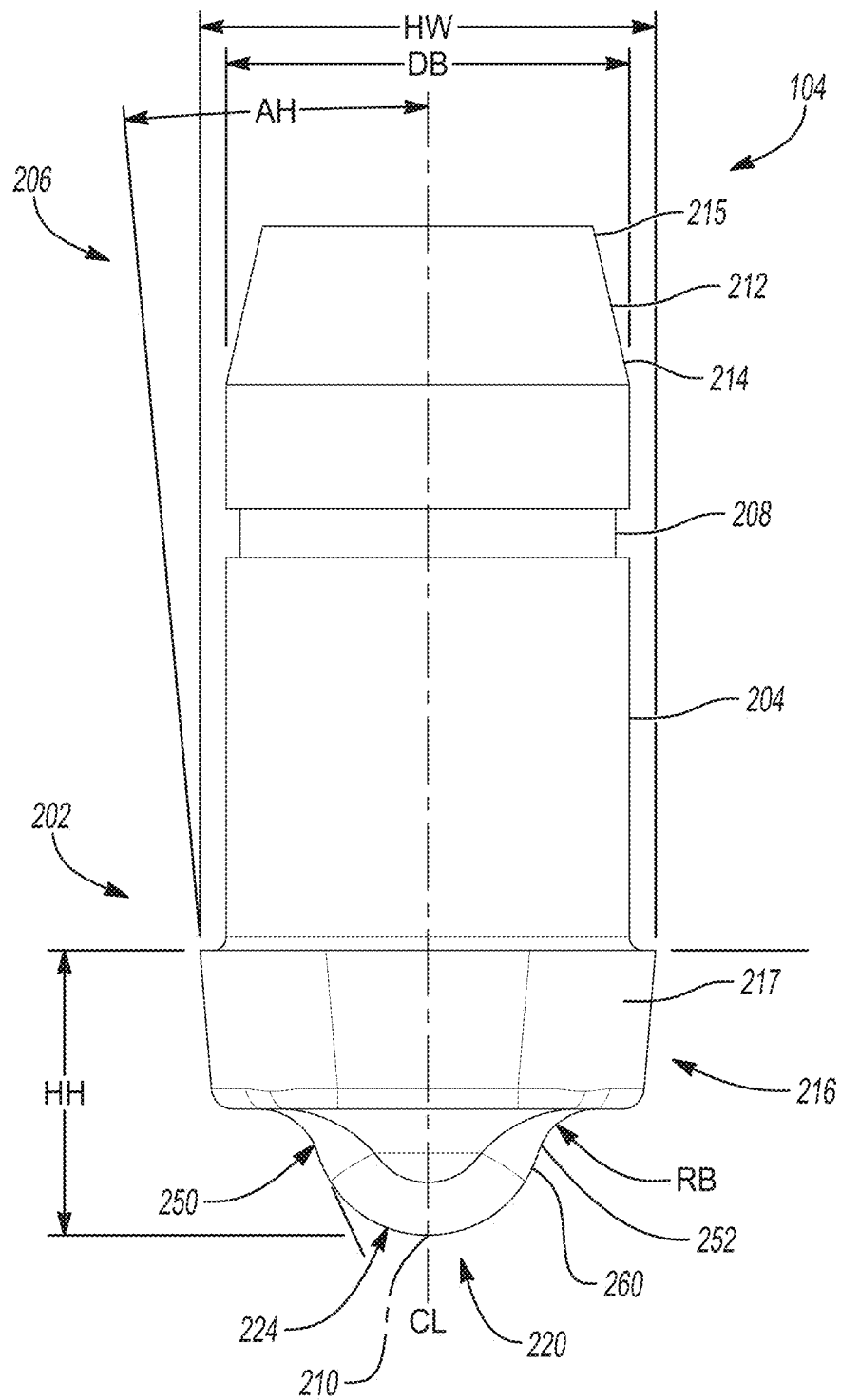
FIG. 2A is an elevation view of a base of the pinch valve illustrated in FIGS. 1A-1C in accordance with various aspects of the present disclosure.
Figure 2B:
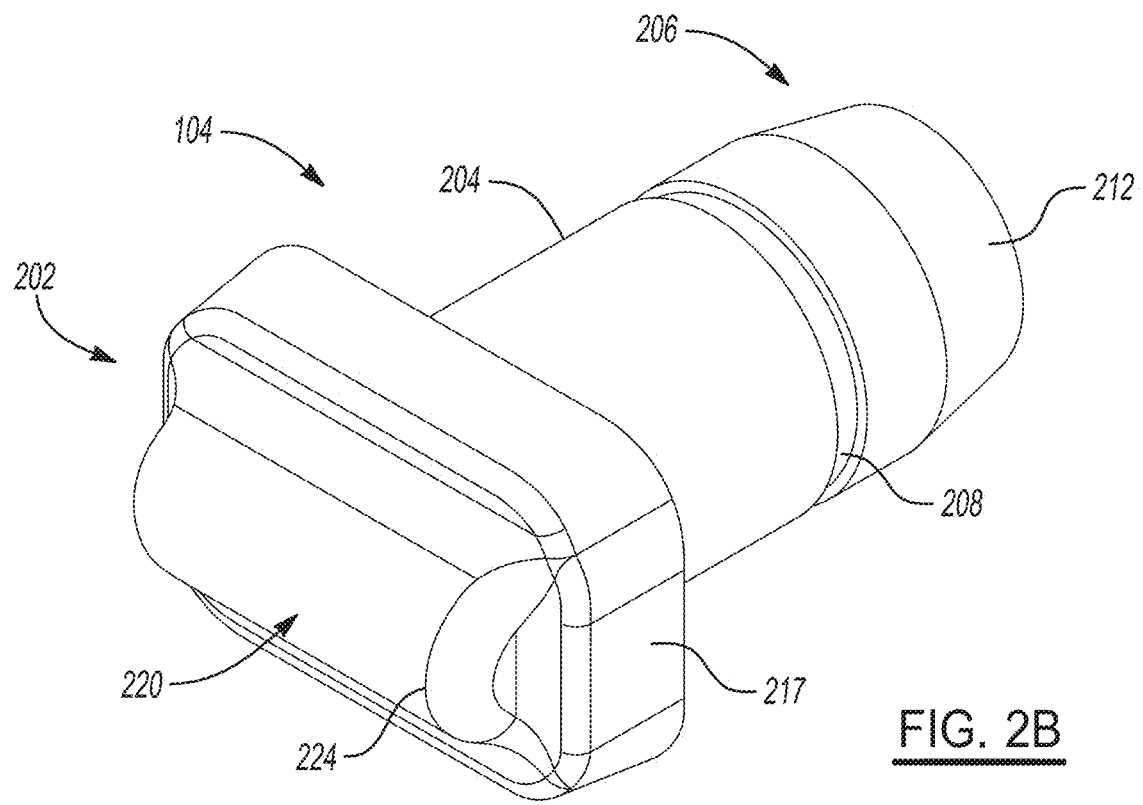
FIG. 2B is a perspective view of the base illustrated in FIG. 2A in accordance with various aspects of the present disclosure.
Figure 2C:
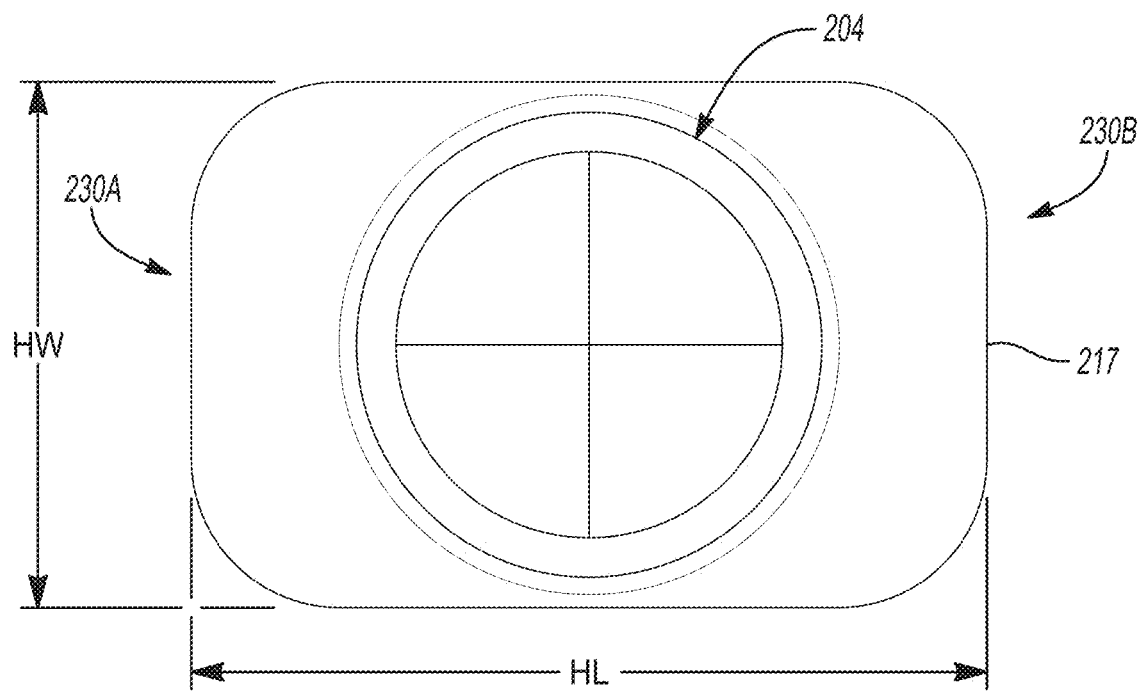
FIG. 2C is a plan view of the base illustrated in FIGS. 2A-2B in accordance with various aspects of the present disclosure.

As best illustrated in FIGS. 2A-2C, the base 104 includes a first portion (also referred to as a body) 204 and second portion (also referred to as a head) 216 having a head height (HH) extending from a first end 202 of the body 204. The body 204 may have a generally cylindrical shape that includes, for example, a recess (also referred to as a groove) 208 disposed therearound (continuously or discontinuously) and configured to receive an o-ring, gasket, spring clip, or other attachment feature that may help to secure the base 104 to a movable or non-movable receiving fixture or apparatus configured to support the pinch valve 100, and in particular, the base 104. For example, in certain variations, the base 104 may be configured to be received by a receptable of the receiving fixture or apparatus and secured (e.g., locked axially) using a set screw or other acceptable fastener. Further, in certain variations, a second end 206 of the body 204 distal to the first end 202 may include a tapered end 212 that can help to appropriately align the base 104 within the receptacle of the receiving fixture or apparatus. For example, a first end 214 of the tapered end 212 may have a first diameter (DB) and a second end 215 distal form the first end 214 may have a second diameter that is less than the first end, while the receptable includes corresponding dimensions. Although not illustrated it should be recognized that the body 204 may take the form of various other shapes so as to be configurable to be received in a receptable of various receiving fixture or receiver configured to support the pinch valve 101.

The head 216 may have a widest diameter (HW) that is larger than the first diameter (DB). The head 216 may have an average diameter that is larger than an average diameter of the body 204. For example, the head 216 may include a periphery portion 217 that is substantially rectangular having a length (HL) that is greater than a width (HW). Although, a rectangular shape is illustrated it should be appreciated that in other variations the periphery portion 217 may take a variety of other configurations. In each variation, the head 216 also includes a protrusion (also referred to as a contact protrusion) 220 extending from the periphery portion 217. The protrusion 220 may have a surface 224 that is generally convex relative to the body 204. In certain variations, the protrusion 220 may be a symmetrical shape (like a bell curve) having an apex 210 centered with a central or major axis (CL) of the base 103. For example, the protrusion 220 may be offset relative to the periphery portion 217 to provide an internal radius (RB) on both a first side 250 and a second side 252 of the head 216. In other words, the protrusion 220 may include one or more sloped portions 260 that forms the apex 210. In each variation, the curvature of the protrusion 220 may provide space for material of the flexible tube 102 (and also the excess material 114 as needed) to move while pinched (e.g., when the base 104 and the anvil 108 are in the closed position or in a position between the closed position and the open position).

As best illustrated in FIGS. 3A-3C, the anvil 108 includes a body (also referred to as a shaft) 304 having a first end 302 and a second end 306, a tip base 316 connecting to the first end 302 of the body 304, and a pinch top 320 connecting to and extending from the tip base 316 away from the first end 302 of the body 304. Like the body 204 of the base 104, the body 304 of the anvil may have a generally cylindrical shape that includes, for example, a recess (also referred to as groove) 308 disposed therearound (continuously or discontinuously) and configured to receive an o-ring, gasket, spring clip, or other attachment feature that may help to secure the anvil 108 to a movable or non-movable receiving fixture or apparatus (e.g., linear actuator 330) configured to support the pinch valve 100, and in particular, the anvil 108. In certain variations, the first end 304 of the body 304 may include the recess 308. For example, the first end 304 of the body 308 including the recess 308 may have a first diameter and the second end 306 may have a second diameter (DA) that is greater than the first diameter. The recess 308 may be centered around the central or major axis (CL) of the anvil 108. In certain variations, the body 304 of the anvil 108 may be inserted into the receptacle and the anvil 108 may be retained by a set screw, or other fastener, that aligns with the recess 308. The set screw, or other fastener, may lock the anvil 108 axially relative to the receptacle.

The pinch tip 320 may be configured as a prism or wedge shape having, for example, at least two planar surfaces 315, 317 each disposed at an acute angle (AA) relative to the central axis (CL) of the anvil 108 (also referred to as the anvil axis). For example, the two planar surfaces 315 may be separated from one another near the tip base 316 and may be joined together at a distal end away from the tip base 316 to form the acute point 324. As illustrated, the acute point 324 may include a radiused edge 325 running from a first side 327 of the pinch tip 320 or anvil 108 to a second side 329 of the pinch tip 320 anvil 108. The radiused edge 325 may be defined by the width of the two planar surfaces 315 and an axis of the radiused edge 325 may be perpendicular to the anvil axis.

In certain variations, the acute point 324 the pinch tip 320 may have a length or height (HAS), and the radiused edge 325 may have a radius greater than or equal to about 0.1 millimeters (mm) to less than or equal to about 2 mm, optionally greater than or equal to about 0.25 mm to less than or equal to about 1 mm, optionally greater than or equal to about 0.25 mm to less than or equal to about 0.5 mm, and in certain aspects, optionally about 0.25 mm. In each variation, the radiused surface 323 of the base 104 may have a first surface area that is at least three times larger than a second surface area of the radiused edge 325 of the acute point 324. In other variations, the radiused surface 323 of the base 104 may have a first surface area that is at least four times larger than a second surface area of the radiused edge 325 of the acute point 324. In still other variations, the radiused surface 323 of the base 104 may have a first surface area that is at least five times larger than a second surface area of the radiused edge 325 of the acute point 324. In still other variations, the radiused surface 323 of the base 104 may have a first surface area that is at least six times larger than a second surface area of the radiused edge 325 of the acute point 324. In still other variations, the radiused surface 323 of the base 104 may have a first surface area that is at least seven times larger than a second surface area of the radiused edge 325 of the acute point 324. In still other variations, the radiused surface 323 of the base 104 may have a first surface area that is at least eight times larger than a second surface area of the radiused edge 325 of the acute point 324. In still other variations, the radiused surface 323 of the base 104 may have a first surface area that is at least nine times larger than a surface area of the radiused edge 325 of the acute point 324. Further still in other variations, the radiused surface 323 of the base 104 may have a first surface area that is be at least ten times larger than a second surface area of the radiused edge 325 of the acute point 324. In certain variations, the radiused surface 323 of the base 104 may have a first surface area that is less than twenty times larger than a second surface area of the radiused edge 325 of the acute point 324. In other variations, the radiused surface 323 of the base 104 may have a first surface area that is less than nineteen times larger than a second surface area of the radiused edge 325 of the acute point 324. In still other variations, the radiused surface 323 of the base 104 may have a first surface area that is less than eighteen times larger than a second surface area of the radiused edge 325 of the acute point 324. In still other variations, the radiused surface 323 of the base 104 may have a first surface area that is less than seventeen times larger than a second surface area of the radiused edge 325 of the acute point 324. In still other variations, the radiused surface 323 of the base 104 may have a first surface area that is less than sixteen times larger than a second surface area of the radiused edge 325 of the acute point 324. In still other variations, the radiused surface 323 of the base 104 may have a first surface area that is less than fifteen times larger than a second surface area of the radiused edge 325 of the acute point 324. In still other variations, the radiused surface 323 of the base 104 may have a first surface area that is less than fourteen times larger than a second surface area of the radiused edge 325 of the acute point 324. In still other variations, the radiused surface 323 of the base 104 may have a first surface area that is less than thirteen times larger than a second surface area of the radiused edge 325 of the acute point 324. In still other variations, the radiused surface 323 of the base 104 may have a first surface area that is less than twelve times larger than a second surface area of the radiused edge 325 of the acute point 324. In still other variations, the radiused surface 323 of the base 104 may have a first surface area that is less than eleven times larger than a second surface area of the radiused edge 325 of the acute point 324. In still other variations, the radiused surface 323 of the base 104 may have a first surface area that is less than ten times larger than a second surface area of the radiused edge 325 of the acute point 324.

As illustrated in FIGS. 1B-1C and 4A-4B, the anvil 108 and the base 104 are configured to collectively apply a pressure to the flexible tube 102. The acute angle (AA) of the anvil 108 may be selected so as to allow material of the flexible tube 102 (and also a portion of the excess material 114 as needed) to move away from the point 324 unrestricted by the pinch tip 320. For example, in certain variations, the acute angle (AA) may be greater than or equal to about 5 degrees to less than or equal to about 45 degrees, optionally greater than or equal to about 15 degrees to less than or equal to about 40 degrees, and in certain aspects, optionally greater than or equal to about 20 degrees to less than or equal to about 30 degrees, relative to the major axis of the anvil 108. In one example, the acute angle (AA) may be about 20 degrees, such that a total angle between the first planar surface 315 and the second planar surface 317 is about 40 degrees. The selected angle isolates contact to the acute point 324 and minimizes the amount of pinch tip 320 in contact with the tube 103 when the pinch valve 100 is in closed position or in a position between the closed position and the open position thereby focusing the pinching force to provide a reliable and flexible seal to the flexible tube 102. Although referred to as a "sharp" or "acute" point 324, it should be understood that the point 324 is configured to prevent injury to the flexible tube 102.

With renewed reference to FIG. 3B, is a rear perspective view of the anvil 108 as attached to a linear actuator 330. Examples of the linear actuator 330 may include a solenoid actuator, a pneumatic actuator, an air cylinder, a hydraulic cylinder, electric linear actuator, a screw actuator, and/or combinations thereof. As illustrated, the linear actuator 330 may include a rod 338 that is configured to extend and retract relative to an actuator body 334. For example, the rod 338 may extend and retract in the y-axis as illustrated by the coordinate system 301, which shows the y-axis, x-axis, z-axis. The coordinate system 301 may be used to define planes (e.g., the XY-plane, the XZ-plane, and the YZ-plane) of the pinch valve 100. These planes may be disposed orthogonal (i.e., 90 degrees) relative to one another. While the origin of the coordinate system 301 may be placed at any point on or near the components of the pinch valve 100, for the purposes of description, the axes of the coordinate system 301 are disposed along the same directions from figure to figure. As illustrated, the width of the linear actuator 330 may be defined as a dimension along the x-axis of the coordinate system 301, the height of the linear actuator 330 may be defined as dimension along the y-axis of the coordinate system 301, and the length of the linear actuator 330 may be defined as a dimension along the x-axis of the coordinate system 301.

In some examples, reference may be made to dimensions, angles, directions, relative positions, and/or movements associated with one or more components of the pinch valve 100 with respect to the coordinate system 301. The rod 338 of the linear actuator 330 may be configured to move along the y-axis, and the rod 338 may include an end offset or hard stop from a first portion of the actuator body 334 by a slide extension length (L1). For example, as illustrated in FIG. 3C, the linear actuator 330 may move between a fully retracted linear actuator state 330A and a fully extended linear actuator state 330C, where a state between the fully retracted linear actuator state 330A and the fully extended linear actuator state 330C is represented by an intermediate extended linear actuator state 330B. In the fully retracted linear actuator state 330A, the acute point 324 of the anvil 108 may be positioned at a first distance (Y1) from the actuator body 334. In the intermediate extended linear actuator state 330B, the acute point 324 of the anvil 108 may be positioned at a second distance (Y2) from the actuator body 334. The second distance (Y2) may be equal to the first distance (Y1) plus a first extension amount. In the fully extended linear actuator state 330C, the acute point 324 of the anvil 108 may be positioned at a third distance (Y3) from the actuator body 334. The third distance (Y3) may be equal to the second distance (Y2) plus a second extension amount. In certain variations, the fully retracted linear actuator state 330A may be the first or open position or state of the pinch valve 100, the fully extended linear actuator state 330C may be the second or closed position or state of the pinch valve 100, and the intermediate extended linear actuator state 330B may be a position between the open position and the closed position of the pinch valve 100. Although shown and described as being attached to the anvil 108, the linear actuator 330 may be attached to the base 104, the anvil 108, and/or both the base 104 and the anvil 108.

FIG. 4A illustrates the pinch valve 100 in the open position, while FIG. 4B illustrates the pinch valve 100 in the closed position. In FIG. 4A, the base 104 is shown axially aligned with the anvil 108. For example, the base 104 is aligned with the anvil 108 such that a major axis of the base 104 (i.e., the base axis) is arranged colinear with a major axis of the anil 109 (i.e., the anvil axis) to form the central axis (CL). Although the major axis of the base 104 and the major axis of the anvil 108 are illustrated as defining a single or continuous line (CL) in FIGS. 4A and 4B, it should be recognized that major axis of the base 104 may be offset relative to the major axis of the anvil 108 by or the major axis of the anvil 108 may be offset relative to the major axis of the base 104 to allow for variances. In either instance, as illustrated, an axis of the acute point 324 may be parallel to an axis of the contact protrusion 220. The flexible tube 102 is disposed between the base 104 and the anvil 108 in a valve gap 105 formed between the radiuses surface 323 of the base 104 and the acute point 324 of the anvil 108. In the open position, the valve gap 105 may be sized such that the flexible tube 102 is in an open or unclamped position.

In contrast, in FIG. 4B, the valve gap 105 may be sized such that the radiuses surface 323 of the base 104 and the acute point 324 of the anvil 108 are brought closer together (e.g., via actuation of the linear actuator 330) and the flexible tube 102 is in a closed or intermediate position. For example, as illustrated, in the closed position, as illustrated, the material defining the flexible tube 102 is made to contact occluding the cavity 110, while material outside of point of contact flexes (including the excess material 114 as needed) to form around the pinch tip 320 of the anvil 108 and/or the protrusion 220 of the base 104. In particular, the material of the flexible tube 102 outside of the pinch area is allowed to freely move into the base relief space 404A and/or the anvil relief space 404B. Conventional pinch valves do not include this relief space, which can cause frictional stretching, increased forces, and wear adjacent to the pinch area. In contrast, the flexing of the material away from the closed portion of the pinch valve 100 in accordance with the current disclosure can prevent contact with the pinch valve 100 and frictional stretching of the flexible tube material along the planar surfaces of the pinch tip 320 and/or the radiused surface 323 of the protrusion 220. The unrestricted movement of the flexible tube material outside of the pinched region enhances the seal quality of the pinch valve 100, decreases stress applied to the soft cassette 102 and helps to prevent wear of the flexible tube 102 and ensure a reliable leakproof seal over repetitive closures or actuations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pinch valve comprising:
a base including
a first shaft having a base axis, the first shaft including a first end and a second end and having a length extending from the first end to the second end that is larger than a width substantially perpendicular to the length; and
a head disposed at the first end of the first shaft, the head including a contact protrusion and a peripheral portion, the contact protrusion having a cross-sectional shape of a bell curve having a first radiused surface that defines an apex disposed at a point furthest from the second end of the first shaft and centered around the base axis and a pair of second radiused surfaces on either side of the first radiused surface that connect the first radiused surface to the peripheral portion such that the peripheral portion has a first average dimension greater than a second average dimension of the first shaft, and such that the first radiused surface of the contact protrusion is disposed offset from and inside the peripheral portion; and
an anvil aligned with the base and including:
a second shaft having an anvil axis and including a first end and a second end, the base axis being colinear with the anvil axis; and
a pinch tip disposed at the first end of the second shaft, the pinch tip having two planar surfaces disposed at acute angles relative to the anvil axis to form an acute point having a radiused edge disposed at a point furthest from the second end of the second shaft and centered around the anvil axis, the radiused edge having a radius greater than or equal to about 0.1 millimeters to less than or equal to about 2 millimeters,
wherein the base and anvil are aligned to form a gap between the radiused surface and the acute point, the base and anvil are movable between a first position and a second position, the gap is a first distance at the first position, the gap is a second distance at the second position, and the second distance is less than the first distance.

2. The pinch valve of claim 1, wherein the two planar surfaces are separated by a first distance at the first end of the second shaft and are joined together to define the acute point at an end away from the second shaft.

3. The pinch valve of claim 2, wherein the radiused edge is defined is defined by a width of the two planar surfaces extending from a first side of the pinch tip to a second side of the pinch tip, an axis of the radiused edge being perpendicular to the anvil axis.

4. The pinch valve of claim 3, wherein the first radiused surface of the base has a first surface area that is at least five times larger than a second surface area of the radiused edge of the acute point.

5. The pinch valve of claim 1, wherein the acute angles are greater than or equal to about 5 degrees to less than or equal to about 45 degrees relative to the anvil axis.

6. The pinch valve of claim 1, wherein the pinch valve further includes an actuator in communication with one of the base and the anvil and configured to move between a first position and a second position.

7. The pinch valve of claim 6, wherein the actuator is a linear actuator configured to receive the second shaft.

8. The pinch valve of claim 6, wherein the actuator is a linear actuator configured to receive the first shaft.

9. The pinch valve of claim 1, wherein the first shaft is cylindrical.

10. A pinch valve assembly comprising:
a base including a shaft, the shaft including a first end and a second end and having a length extending from the first end to the second end that is larger than a width substantially perpendicular to the length, the first end of the shaft having a cross-sectional shape of a bell curve including a first radiused surface and a pair of second radiused surfaces on either side of the first radiused surface that connect the first radiused surface to a peripheral portion disposed at a point furthest from the second end of the shaft, the first radiused surface having a first surface area and defining a base apex centered around a base center axis, the peripheral portion having a first average dimension greater than a second average dimension of the shaft, and the first radiused surface being disposed offset from and inside the peripheral portion;

an anvil aligned with the base and including a radiused edge having a second surface area and defining an anvil apex centered around an anvil center axis, the radiused edge having a radius greater than or equal to about 0.1 millimeters to less than or equal to about 2 millimeters, the first surface area being at least five times larger than the second surface area; and a linear actuator in communication with at least one of the base and the anvil and configured to move between a first position and a second position, the first radiused surface of the base opposing the radiused edge of the anvil to form a gap and in the first position a first gap distance is defined between the first radiused surface and the radiused edge and in the second position a second gap distance smaller than the first gap distance is defined between the first radiused surface and the radiused edge.

11. The pinch valve assembly of claim 10, further including:

a flexible tubing having a hollow cavity disposed in the gap between the first radiused surface of the base and the radiused edge of the anvil, in the first position the hollow cavity having a first dimension and in the second position the hollow cavity having a second dimension that is less than the first dimension.

12. The pinch valve assembly of claim 11, wherein the flexible tubing includes comprises a soft cassette.

13. The pinch valve assembly of claim 10, wherein the shaft is a first shaft, and the anvil further includes:

a second shaft including a first end and a second end; and a pinch tip disposed at the first end of the second shaft, the pinch tip including two planar surfaces disposed at acute angles relative to the anvil axis to form the radiused edge disposed at a point further from the second end of the second shaft.

14. The pinch valve assembly of claim 13, wherein the two planar surfaces are separated by a first distance at the first end of the second shaft and are joined together to form an acute angle at an end away from the second shaft thereby defining the radiused edge, the radiused edge extending from a first side of the pinch tip to a second side of the pinch tip and an axis of the radiused edge is perpendicular to the anvil axis.

15. The pinch valve assembly of claim 13, wherein the acute angles are greater than or equal to about 5 degrees to less than or equal to about 45 degrees relative to the anvil axis.

16. A pinch valve comprising:

a base including a shaft, the shaft including a first end and a second end and having a length extending from the first end to the second end that is larger than a width substantially perpendicular to the length, the first end of the shaft having a cross-sectional shape of a bell curve including a first radiused surface and a pair of second radiused surfaces on either side of the first radiused surface that connect the first radiused surface to a peripheral portion disposed at the first end of the shaft, the first radiused surface having a first surface area and defining a base apex centered around a base center axis, the peripheral portion having a first average dimension greater than a second average dimension of the shaft, and the first radiused surface being disposed offset from and inside the peripheral portion; and an anvil aligned with the base and including a radiused edge having a second surface area and defining an anvil apex centered around an anvil center axis, the radiused edge having a radius greater than or equal to about 0.1 millimeters to less than or equal to about 2 millimeters, the first surface area being at least five times larger than the second surface area, and the first radiused surface of the base opposing the radiused edge of the anvil to form a gap and the pinch valve is movable between a first position where the gap has a first gap distance and a second position where the gap has a second gap distance that is less than the first gap position.

17. The pinch valve of claim 16, wherein the first radiused surface is a convex surface, and the anvil includes:

a pinch tip including two planar surfaces disposed at acute angles relative the anvil axis to form the radiused edge, the two planar surfaces being separated by a first distance at a first end of the pinch tip and joined together to form the radiused edge at a second end of the pinch tip, and the acute angles being greater than or equal to about 5 degrees to less than or equal to about 45 degrees relative to the anvil axis.

18. The pinch valve of claim 16, wherein the second end of the shaft includes a tapered portion, a first end of the tapered portion has a first average dimension and a second end of the tapered portion away from the first end of the tapered portion has a second average dimension that is less than the first average dimension, and the first average dimension of the tapered portion is equal to the first average dimension of the shaft.

* * * * *